United States Patent
Dajer et al.

(10) Patent No.: US 6,930,990 B2
(45) Date of Patent: Aug. 16, 2005

(54) SERIAL COMMUNICATIONS LINK FOR A BASE STATIONS

(75) Inventors: Miguel Dajer, Succasunna, NJ (US); Kenneth Yiu-Kwong Ho, Ledgewood, NJ (US); Peter Keith LaConte, West Paterson, NJ (US); Keith Elden Strege, Branchburg Township, Somerset County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 865 days.

(21) Appl. No.: 09/815,855

(22) Filed: Mar. 23, 2001

(65) Prior Publication Data

US 2002/0136185 A1 Sep. 26, 2002

(51) Int. Cl.[7] .............................................. H04B 7/216
(52) U.S. Cl. ...................... 370/335; 370/320; 370/342; 370/441
(58) Field of Search ................................ 370/335, 337, 370/282, 278, 328, 347, 320, 342, 441, 329, 310, 203, 206, 215, 277, 330, 334, 436, 479, 376, 458, 459, 508, 68; 375/235, 261, 298; 455/550.1, 561, 562.1, 517, 557, 422.1, 525, 426.1, 426.2, 552.1, 456.5, 524, 560, 56.1, 403

(56) References Cited

U.S. PATENT DOCUMENTS

| | | | | |
|---|---|---|---|---|
| 5,548,582 A | * | 8/1996 | Brajal et al. | 370/206 |
| 5,555,268 A | * | 9/1996 | Fattouche et al. | 375/141 |
| 5,721,756 A | * | 2/1998 | Liebetreu et al. | 375/344 |
| 5,764,692 A | * | 6/1998 | Mucke | 375/216 |
| 5,915,214 A | * | 6/1999 | Reece et al. | 455/406 |
| 5,926,745 A | * | 7/1999 | Threadgill et al. | 455/12.1 |
| 6,032,034 A | * | 2/2000 | Rabina et al. | 455/401 |
| 6,085,080 A | * | 7/2000 | Rahikainen et al. | 455/403 |
| 6,298,035 B1 | * | 10/2001 | Heiskala | 370/206 |
| 6,381,461 B1 | * | 4/2002 | Besson et al. | 455/450 |
| 6,587,448 B1 | * | 7/2003 | Dajer et al. | 370/335 |
| 2003/0193914 A1 | * | 10/2003 | Lomp et al. | 370/335 |

* cited by examiner

Primary Examiner—Wellington Chin
Assistant Examiner—Jamal A. Fox
(74) Attorney, Agent, or Firm—Jimmy Goo (57) ABSTRACT

Disclosed is an interface and method for data transmission between digital and radio frequency (RF) components of a base station. The interface and method involves transmitting transmit or receive data over a first set of time slots and transmitting various uplink or downlink low rate static/ control signals over a second set of time slots. The transmit data includes in-phase transmit data bits and quadrature phase transmit bits, and the receive data includes in-phase transmit data bits and quadrature phase transmit bits received over a diversity antenna system.

43 Claims, 5 Drawing Sheets

| DATA | SIGNALS[a] | BIT | DATA RATE | COMMENTS |
|---|---|---|---|---|
| UP TO RF EQUIPMENT ||||| 
| Tx DATA BUS | LTX01AI0 | 0 | 19.6608 MHz | EACH SECTOR MUXED AT 78.6432 MHz |
| | LTX01AI1 | 1 | 19.6608 MHz | |
| | LTX01AQ0 | 2 | 19.6608 MHz | |
| | LTX01AQ1 | 3 | 19.6608 MHz | |
| ARCNET BUS | ARCNET_TXEN | 10, 11 | 1.25 Mbps | |
| EVEN SECOND TICK | EVEN_SEC | 12 (TRANSMITTED ON ONE MULTIPLEXED CHANNEL) | 19.6608 MHz | 1 PULSE EVERY 2 SEC, 19.6608 MHz RESOLUTION |
| RADIO SERIAL PORT | CBRSER | | LOW | TO PCBR |
| SERIAL PORT FROM RADIO CONTROLLER | CRCSER | | LOW | RESERVED FOR FUTURE USE |
| RADIO RF EMERGENCY SWITCH | CBR_SW | | STATIC | TO PCBRs; ONE TO PCBR IN EACH RFU |
| CCU AVAILABLE | CAVAIL_N | | STATIC | STATIC, TRANSMIT IN CONTROL CHANNEL. ONE TO EACH OF THREE RFUs |
| SPARE | - | | - | |
| SPARE | - | | - | |
| SPARE | - | | - | |
| PHYSICAL ADDRESS | RF ENCLOSURE_ID (3:0) | 13 (TRANSMITTED ON ONE MULTIPLEXED CHANNEL) | STATIC | 4 UNIQUE BITS TO EACH RFU |
| MULTIPLEX SYNC PULSE | | 14 | 2.4576 Mbps | |
| SPARE | | 4 | - | RESERVED FOR FUTURE USE |
| SPARE | | 5 | - | RESERVED FOR FUTURE USE |
| SPARE | | 6 | - | RESERVED FOR FUTURE USE |
| SPARE | | 7 | - | RESERVED FOR FUTURE USE |
| SPARE | - | 8 | - | RESERVED FOR FUTURE USE |
| SPARE | - | 9 | - | RESERVED FOR FUTURE USE |
| PARITY | - | 15 | - | PARITY CHECK |
| 19.6608 MHz CLOCK |||| NOT SENT; SCLK23 CLOCK IS RECOVERED IN RF ENCLOUSURE; SCLK34 IS THEN GENERATED FROM SCLK23 |

FIG. 4
50

| SLOT/BIT | 0 | 1 | 2 | 3 | 4 | 5 | 6 | 7 | 8 | 9 |
|---|---|---|---|---|---|---|---|---|---|---|
| DATA | LTX01AI0 | LTX01AI1 | LTX01AQ0 | LTX01AQ1 | SPARE | SPARE | SPARE | SPARE | SPARE | SPARE |

| SLOT/BIT | 10 | 11 | 12 | 13 | 14 | 15 | 16 | 17 | 18 | 19 |
|---|---|---|---|---|---|---|---|---|---|---|
| DATA | ARCNET_EN | ARCNET | MUX | MUX | MUX SYNC | PARITY | RESERVED FOR FOM USE | | | |

| DATA | SIGNALS<sup>a</sup> | BIT | DATA RATE | COMMENTS |
|---|---|---|---|---|
| DOWN TO BBU ||||||
| RXDATA | RXIA0 | 0 | 19.6608 MHz | DIV0/DIV1 ARE MULTIPLEXED IN DATA STREAM |
|  | RXIA1 | 1 | 19.6608 MHz |  |
|  | RXIA2 | 2 | 19.6608 MHz |  |
|  | RXIA3 | 3 | 19.6608 MHz |  |
|  | RXQA0 | 4 | 19.6608 MHz |  |
|  | RXQA1 | 5 | 19.6608 MHz |  |
|  | RXQA2 | 6 | 19.6608 MHz |  |
|  | RXQA3 | 7 | 19.6608 MHz |  |
| ARCNET | ARCNET_RX | 11 | 1.25 Mbps |  |
| BYPASS FROM RADIO | CLBYP_N | 12 (ONE MUXED CHANNEL) | STATIC | FROM RADIO |
| SERIAL PORT TO CDMA RADIO CONTROLLER | CRCSER |  | LOW |  |
| RADIO SERIAL PORT | CBRSER |  | LOW |  |
| SPARE | – |  | – | RESERVED FOR FUTURE USE |
| SPARE | – |  | – | RESERVED FOR FUTURE USE |
| SPARE | – |  | – | RESERVED FOR FUTURE USE |
| SPARE | – |  | – | RESERVED FOR FUTURE USE |
| SPARE | – |  | – | RESERVED FOR FUTURE USE |
| DEMULTIPLEXER SYNC |  | 14 | 2.4576 Mbps |  |
| PARITY | – | 15 | – | PARITY CHECK |
| SPARE | – | 8 | – | RESERVED FOR FUTURE USE |
| SPARE | – | 9 | – | RESERVED FOR FUTURE USE |
| SPARE | – | 10 | – | RESERVED FOR FUTURE USE |
| SPARE | – | 13 | – | RESERVED FOR FUTURE USE |

| SLOT/BIT | 0 | 1 | 2 | 3 | 4 | 5 | 6 | 7 | 8 | 9 |
|---|---|---|---|---|---|---|---|---|---|---|
| DATA | RXIA0 | RXIA1 | RXIA2 | RXIA3 | RXQA0 | RXQA1 | RXQA2 | RXQA3 | SPARE | SPARE |

| SLOT/BIT | 10 | 11 | 12 | 13 | 14 | 15 | 16 | 17 | 18 | 19 |
|---|---|---|---|---|---|---|---|---|---|---|
| DATA | SPARE | ARCNET | MUX | MUX | MUX SYNC | PARITY | RESERVED FOR FOM USE | | | |

SERIAL COMMUNICATIONS LINK FOR A BASE STATIONS

FIELD OF THE INVENTION

The present invention relates generally to wireless communication systems and, in particular, to data transmission between base station components.

BACKGROUND OF THE RELATED ART

Flexibility in base station design is a desirable feature sought by service providers. Base station design flexibility affords the service providers the opportunity to customize base station installations for a variety of circumstances. One manner of achieving flexibility in wireless communication systems based on the well-known code division multiple access (CDMA) technique is to separate a base station's digital components, such as CDMA channel units having a plurality of channel elements, from a base station's radio frequency (RF) components, such as radio units. Separating the digital components from the RF components allows, for example, the RF components to be mounted at the top of a pole and the digital components to be mounted at the base of the pole. A transmission medium, such as an optical fiber, is used to transport data between the RF and digital components.

SUMMARY OF THE INVENTION

The present invention is an interface and method for data transmission between digital and radio frequency (RF) components of a base station. In one embodiment, the present invention involves transmitting transmit or receive data over a first set of time slots and transmitting various uplink or downlink low rate static/control signals over a second set of time slots. The transmit data includes in-phase transmit data bits and quadrature phase transmit bits, and the receive data includes in-phase transmit data bits and quadrature phase transmit bits received over a diversity antenna system.

In an embodiment, the in-phase transmit data bits comprises of a first in-phase transmit data bit and a second in-phase transmit data bit, wherein the first in-phase transmit data bit is transmitted over a first time slot and the second in-phase transmit data bit is transmitted over a second time slot; the quadrature phase transmit data bits comprises of a first quadrature phase transmit data bit and a second quadrature phase transmit data bit, wherein the first quadrature phase transmit data bit is transmitted over a third time slot in the first set of time slots and the second quadrature phase transmit data bit is transmitted over a fourth time slot in the first set of time slots; and the various uplink low rate static/control signals comprises of clock/reference signals, uplink RS-485 based bus data, physical address information, adjacent CDMA channel unit availability information, input information via uplink serial ports and a radio RF emergency switch, wherein the clock/reference signals, adjacent CDMA channel unit availability information, input information via uplink serial ports and a radio RF emergency switch are multiplexed for transmission over a fifth time slot, the uplink RS-485 based bus data is transmitted over a sixth and seventh time slot and the physical address information is transmitted over a eighth time slot.

In another embodiment, the in-phase receive data comprises of a first in-phase receive data bit, a second in-phase receive data bit, a third in-phase receive data bit and a fourth in-phase receive data bit and the quadrature phase receive data comprises of a first quadrature phase receive data bit, a second quadrature phase receive data bit, a third quadrature phase receive data bit and a fourth quadrature phase receive data bit, wherein the first and second in-phase and quadrature phase receive data bits were received over a first antenna and the third and fourth in-phase and quadrature phase receive data bits were received over a second antenna, the first in-phase receive data bit being transmitted over a first time slot, the second in-phase receive data bit being transmitted over a second time slot, the third in-phase receive data bit being transmitted over a third time slot, the fourth in-phase receive data bit being transmitted over a fourth time slot, the first quadrature phase receive data bit being transmitted over a fifth time slot, the second quadrature phase receive data bit being transmitted over a sixth time slot, the third quadrature phase receive data bit being transmitted over a seventh time slot, the fourth quadrature phase receive data bit being transmitted over an eighth time slot; and the various downlink low rate static/control signals comprises of bypass information, input information via downlink serial ports and downlink RS-485 based bus data, wherein the bypass information and input information via downlink serial ports are multiplexed for transmission over a ninth time slot and the downlink RS-485 based bus data is transmitted over a tenth time slot.

BRIEF DESCRIPTION OF THE DRAWINGS

The features, aspects, and advantages of the present invention will become better understood with regard to the following description, appended claims, and accompanying drawings where

DETAILED DESCRIPTION

The present invention is an interface for data transmission between digital and radio frequency (RF) components of a base station based on code division multiple access (CDMA) techniques. The interface of the present invention is described herein with respect to an interface used in conjunction with fiber optic cables, i.e., fiber optic interface. It should be understood that the interface described herein is also applicable to interfaces used in conjunction with other transmission mediums.

Figure 1:
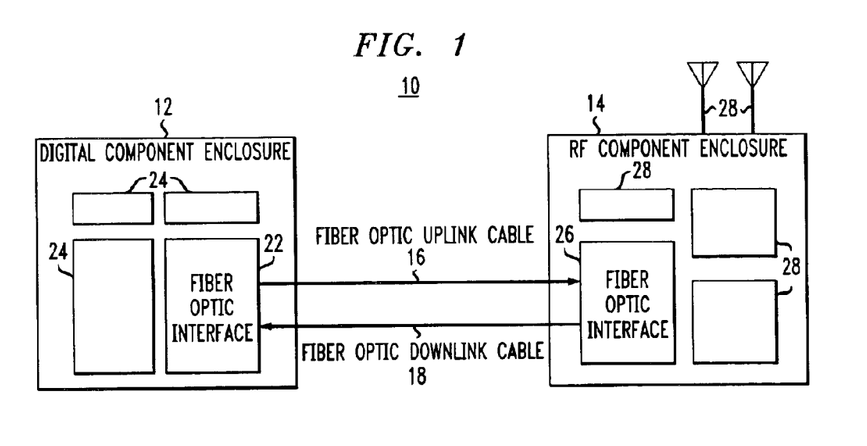
FIG. 1 depicts a base station used in accordance with the present invention.

FIG. 1 depicts a base station 10 used in accordance with the present invention. Base station 10 comprises a digital component enclosure 12, a RF component enclosure 14 and fiber optic cables 16, 18 connecting two enclosures. Digital component enclosure 12 having a fiber optic interface 22 and digital components 24, such as CDMA channel units; RF component enclosure 14 having a fiber optic interface 26 and RF components 28, such as radios and a diversity antenna system; and the fiber optic interfaces 22, 26 being operable to serialize and deserialize data to be transmitted or received over fiber optic cables 16, 18. Note that base station 10 is shown with a diversity antenna system comprising of two RF antennas. It should be understood that the present invention is also applicable to a non-diversity antenna system or a diversity antenna system having more than two RF antennas. It should also be understood that only one fiber optic cable (or other transmission medium, such as wireless, twisted pair, etc.) may be used for both the uplink and downlink transmissions.

Data transmitted from digital component enclosure 12 to RF component enclosure 14, i.e., uplink, and vice-versa, i.e., downlink, includes transmit and receive data, control, and status information and timing signals, wherein transmit and receive data includes data to be transmitted and received from mobile-telephones. Uplink data being transmitted over fiber optic cable 16, and downlink data being transmitted over fiber optic cable 18.

In one embodiment, transmissions over uplink fiber optic cable 16 are partitioned into twenty time slots or channels. If the overall transmission data rate for uplink fiber optic cable 16 is 393.216 MHz, then the uplink data transmitted over each time slot would be at a clock rate of 19.6608 MHz. Similarly, transmission over downlink fiber optic cable 16 are portioned into twenty time slots at the 19.6608 MHz clock rate per time slot. The present invention will be described herein with respect to the aforementioned data rates and number of channels. It should be understood that the present invention may be equally applied to other data rates and number of channels.

In one embodiment, the uplink data comprises data to be transmitted to mobile-telephones (i.e., transmit data) and various uplink low rate static/control signals. The transmit data is referred to herein as LTX (or local transmit) data. The LTX data includes LTXI and LTXQ data. The LTXI data comprises two bits of in-phase LTX data transmitted at a 19.6608 MHz clock rate, which is the clock rate based on the uplink data rate of 393.216 MHz. The LTXQ data comprises two bits of quadrature phase LTX data transmitted at the 19.6608 MHz clock rate.

The various uplink low rate static/control signals include clock/reference signals, uplink RS-485 based bus data, physical address information, adjacent CDMA channel unit availability information, input information via uplink serial ports and a radio RF emergency switch. The clock/reference signals include an even second signal and a system clock signal. The even second signal, also referred herein as even_sec signal, is a negative going pulse transmitted every two seconds. The system clock signal, also referred to herein as SCLK23±19.6608 MHz signal, is an in-phase signal generated on the rising edge of a chip clock with a differential signal. Note that the SCLK23±19.6608 MHz signal is derived at RF component enclosure 14 from the uplink data rate of 393.216 MHz (or 19.6608 MHz per time slot).

The uplink RS-485 based bus data, also referred to herein as ARCNET_TXEN, indicates control bus information in accordance with the electrical standards followed by Arc-Net. In one embodiment, ARCNET_TXEN comprises a control bus bit from multiple serial bits and an enable bit for enabling transmission of ArcNet information. The physical address information includes four bits for indicating a particular RF component enclosure to which LTX data is intended.

The adjacent CDMA channel unit availability information, also referred to as CAVAIL_N information, indicates to RF component enclosure 14 if the last CDMA channel unit (in a series of CDMA channel units) at digital component enclosure 12 is available and operational. The input information via uplink serial ports, also referred to as CBRSER and CRCSER, includes control information provided by test equipment attached to digital component enclosure 12 via radio and/or radio controller serial ports, respectively. The radio RF emergency switch, also referred to as CBR_SW, indicates to RF component enclosure 12 to turn itself or one or more of its components to on or off.

In one embodiment, the downlink data comprises data received from mobile-telephones (i.e., receive data) and various downlink low rate static/control signals. The receive data, also referred herein as RX data, includes RXI and RXQ data. The RXI data comprises four bits of in-phase RX data at the 19.6608 clock rate, which is based on the 393.216 MHz downlink data rate over fiber optic cable 18, wherein two in-phase RX data bits are received over one RF antenna and the other two in-phase data bits are received over the other RF antenna (for a two antenna diversity system). The RXQ data comprising of four bits of quadrature phase RX data at the 19.6608 clock rate, wherein two quadrature phase RX data bits are received over one RF antenna and other two quadrature RX data bits are received over the other RF antenna. Note that the two bits of RXI and RXQ data received over one RF antenna and the two bits of RXI and RXQ data received over the other RF antenna are multipath versions of the same two RXI and RXQ bits transmitted by the mobile-telephone.

The various downlink low rate static/control signals include bypass information, input information via downlink serial ports and downlink RS-485 based bus data. The bypass information, also referred to as CLBYP_N information, is a response to the CAVAIL_N information to bypass the last CDMA channel unit in the appropriate situation, such as when the last CDMA channel unit is non-operational. The input information via downlink serial ports, also referred to as CBRSER and CRCSER, include control information provided by test equipment attached to RF component enclosure 14 via radio and/or radio controller serial ports, respectively. The downlink RS-485 based bus data, also referred to herein as ARCNET_RX, indicates control bus information in accordance with electrical standards followed by ArcNet. ARCNET_RX comprises one bit of control bus information from multiple serial bits of data.

Figure 2:
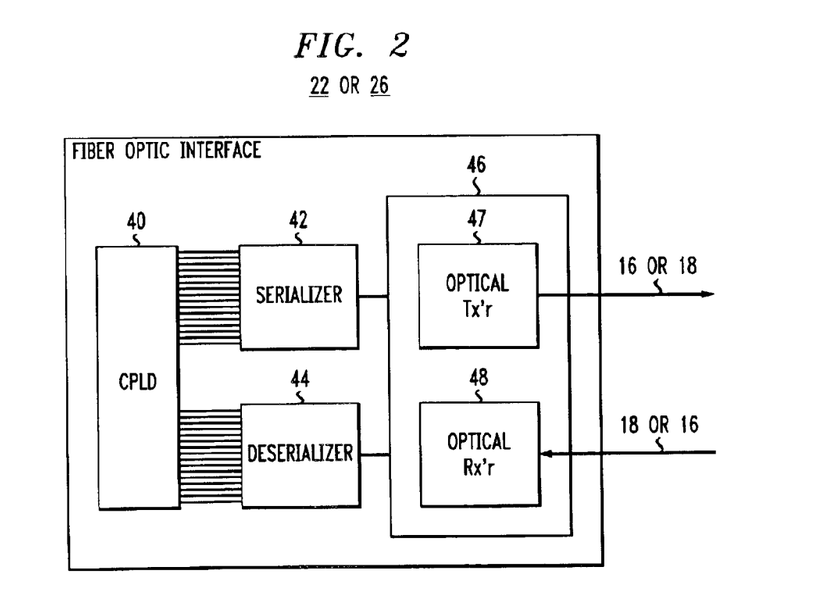
FIG. 2 depicts a detailed illustration of an embodiment of a fiber optic interface.

In both the directions, the uplink and downlink data streams are transmitted over fiber optic cables 16, 18 using fiber optic interfaces 22, 26. FIG. 2 depicts a detailed illustration of an embodiment of fiber optic interface 22. For brevity reasons, fiber optic interface 26 will be assumed to be identical to fiber optic interface 22 and, thus, will not be discussed separately herein. It should be understood that fiber optic interfaces 22, 26 may not be identical to each other.

Fiber optic interface 22 comprises a complex programmable logic device (CPLD) 40, a serializer 42, a deserializer 44 and a transceiver 46. CPLD 40 is connected to serializer 42 via a set of sixteen parallel data buses or other connections, and to deserializer 44 via a separate set of sixteen parallel data buses or other connections. Serializer 42 and deserializer 44 are each connected to transceiver 46 via separate data buses or connections. Transceiver 46 includes an optical transmitter 47 and an optical receiver 48, wherein optical transmitter 47 is connected to serializer 42 and optical receiver 48 is connected to deserializer 44.

CPLD 40 receives uplink data from digital components 24 (also referred to as digital backhaul) and, where appropriate, multiplexes certain components of the uplink data. For example, the clock/reference signals and radio RF emergency switch is multiplexed for transmission over a single time slot. The received uplink data and multiplexed components of the uplink data are provided by CPLD 40 to serializer 42 along with a multiplex synchronization pulse and a parity bit over the sixteen parallel data buses connecting CPLD 40 to serializer 42, wherein the multiplex synchronization pulse and the parity bit are generated by CPLD 40 for synchronizing both fiber optic interfaces 22, 26 and error control, respectively. The parity bits being based on the first fifteen bits of data (and not the coding bits). Note that in the downlink direction, CPLD 40 generates a demultiplex synchronization pulse for synchronizing both fiber optic interfaces 22, 26.

The particular one of sixteen parallel data bus over which an uplink data component is transmitted to serializer 42 by CPLD 40 depends on the time slot or channel over which the uplink data component will be transmitted. In one embodiment, there exists a one-to-one relationship between each of the data bases and the time slots. For example, if the first bit of LTXI data is to be transmitted over the first time slot (i.e., time slot 0), then such bit is transmitted to serializer 42 over the first data bus connecting CPLD 40 to serializer 42. Likewise, if the second bit of LTXI data is to be transmitted over the second time slot (i.e., time slot 1), then such bit is transmitted to serializer 42 over the second data bus connecting CPLD 40 to serializer 42.

From the sixteen parallel data buses, serializer 42 receives sixteen bitwise inputs which are subsequently sequentially transmitted along with four coding bits to transceiver 46 at the clock rate (or a frame rate) of 19.6608 MHz, wherein the coding bits are generated by serializer 42 for indicating to the deserializer at fiber optic interface 26 a manner of decoding the uplink data stream. Thus, twenty bits can be sequentially transmitted from serializer 42 to transceiver 46 per frame (or twenty time slots). The bits transmitted by serializer 42 is also referred to herein as a "serial uplink data stream." At transceiver 46, optical transmitter 47 transmits the serial uplink data stream over optical fiber cable 16 to an optical receiver at RF component enclosure 14.

At optic fiber interface 22, a serial downlink data stream is received by optical receiver 48 from RF component enclosure 14. The serial downlink data stream is transmitted to deserializer 44, where the serial downlink data stream is deserialzed using coding bits included in the serial downlink data stream. The deserialized serial downlink data stream (without the four coding bits which were in the serial downlink data stream) is sequentially bitwise transmitted over the sixteen parallel data buses connecting deserializer 44 to CPLD 40 according to the time slot over which the bits arrived. Likewise, at CPLD 40, the received bits are routed to the appropriate digital components based on the data buses over which they arrived.

Figure 3:
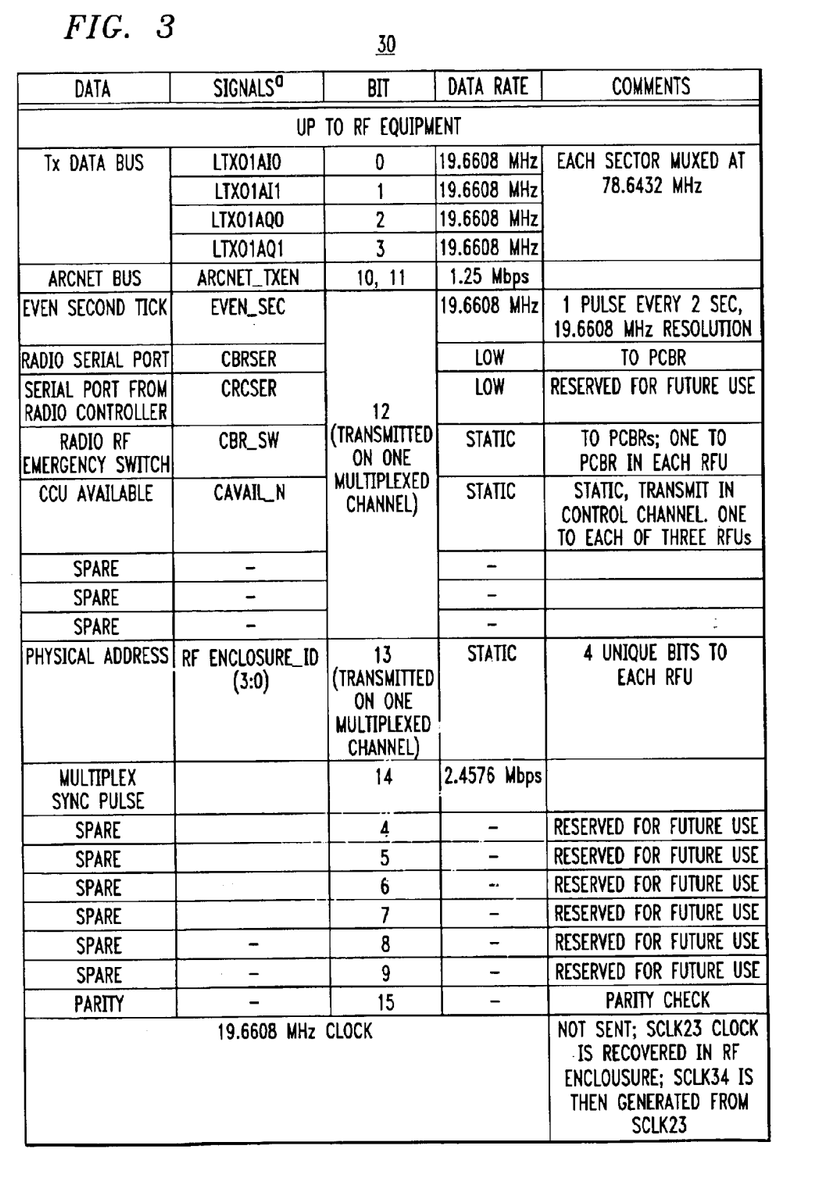
FIG. 3 depicts a chart indicating bit positions of uplink data components in a frame in accordance with one embodiment.
Figure 4:
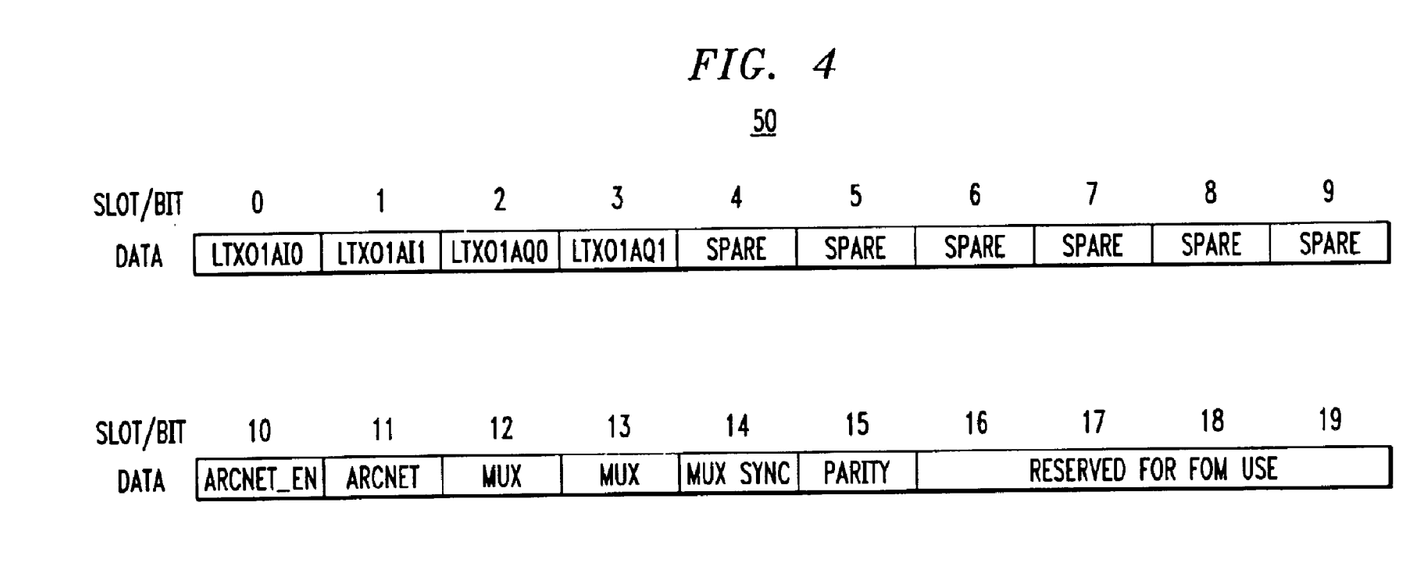
FIG. 4 depicts an uplink data transmission illustrating bits of a frame being transmitted in the uplink direction over their corresponding time slots or channels in accordance with one embodiment of the invention.

FIG. 3 depicts a chart 30 indicating bit positions of uplink data components in a frame in accordance with one embodiment. Specifically, the first bit of LTXI data, also referred to as LTXO1AI0, is transmitted as bit 0 of the frame at the 19.6608 MHz clock rate; the second bit of LTXI data, also referred to as LTXO1AI1, is transmitted as bit 1 of the frame at the 19.6608 MHz clock rate; the first bit of LTXQ data, also referred to as LTXO1AQ0, is transmitted as bit 2 of the frame at the 19.6608 MHz clock rate; the second bit of LTXQ data, also referred to as LTXO1AQ1, is transmitted as bit 3 of the frame at the 19.6608 MHz clock rate; bits 4–9 are reserved for future use and no bits are being transmitted in these bit positions; the two bits of uplink RS-485 based bus data or ARCNET_TXEN are transmitted as bits 10 and 11 of the frame at 1.25 Mbps; bit 12 of the frame corresponds to a multiplexed channel for the transmission of the clock/reference signals, the input information via uplink serial ports, radio RF emergency switch and adjacent CDMA channel unit availability information at various data rates; bit 13 of the frame corresponds to a multiplexed channel for the transmission of the physical address; the multiplex synchronization pulse bit is transmitted as bit 14 of the frame at 2.4576 Mbps; the parity bit is transmitted as bit 15 of the frame; and the four coding bits are transmitted as bits 16–19 of the frame. FIG. 4 depicts an uplink data transmission 50 illustrating bits of a frame being transmitted in the uplink direction over their corresponding time slots or channels in accordance with one embodiment of the invention.

Figure 5:
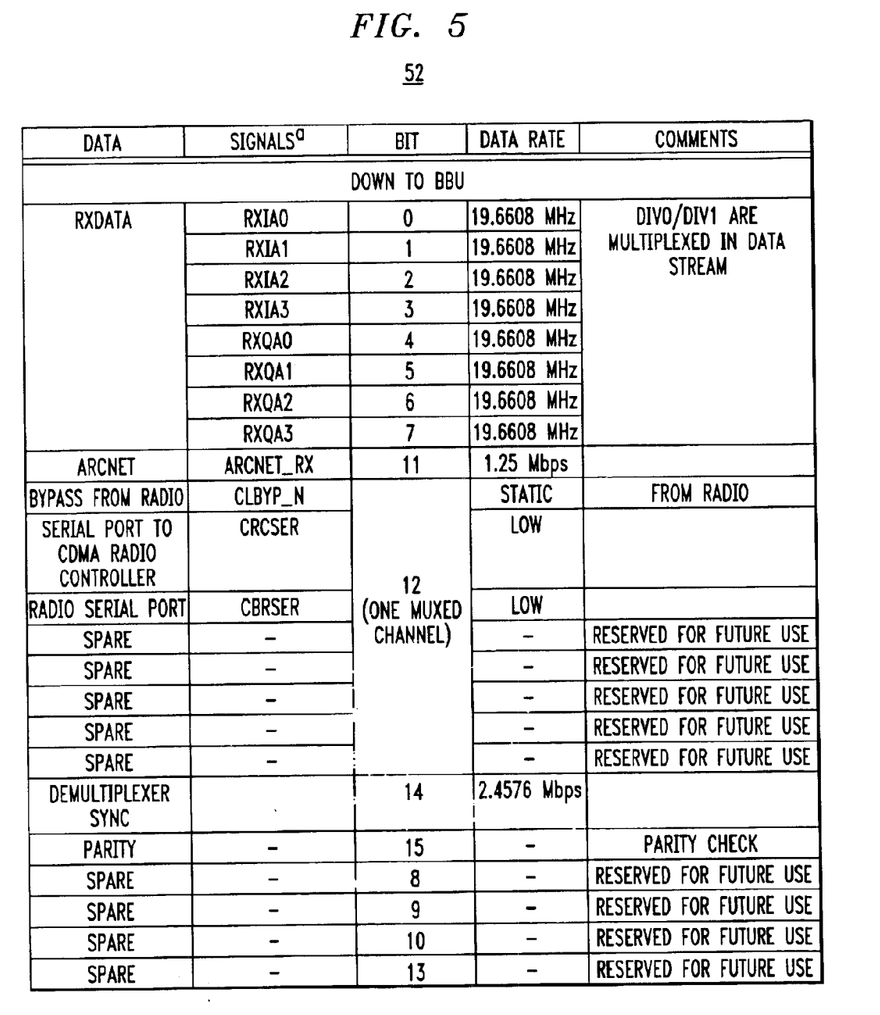
FIG. 5 depicts a chart indicating bit positions of downlink data components in a frame in accordance with one embodiment.
Figure 6:
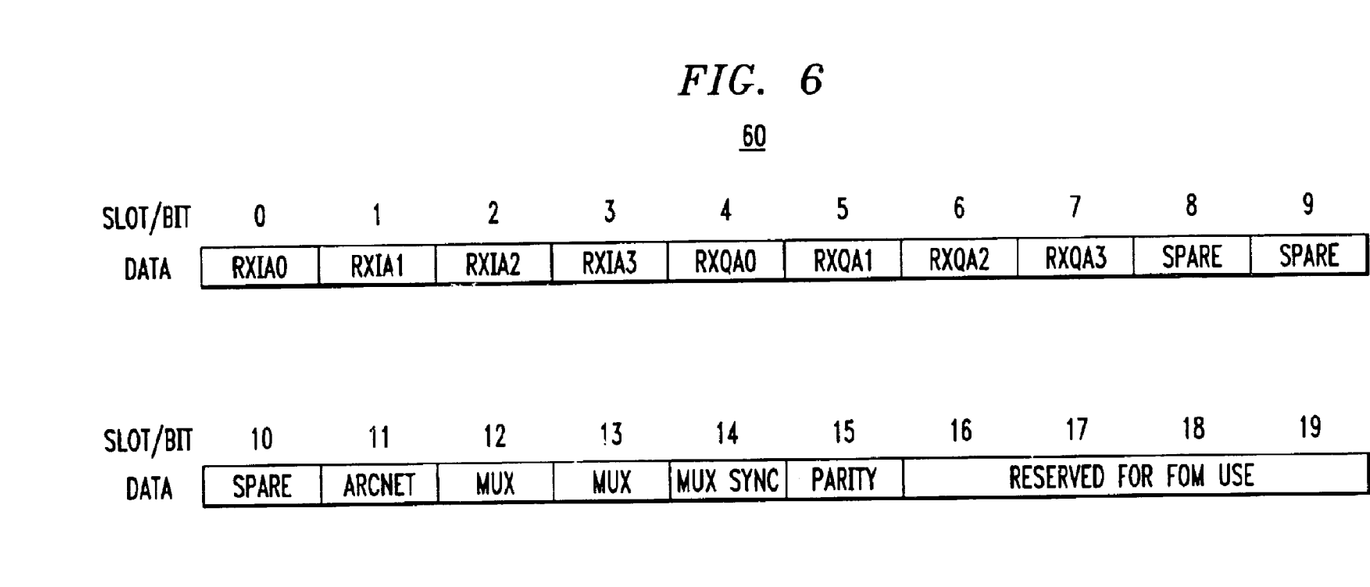
FIG. 6 depicts a downlink data transmission illustrating bits of a frame being transmitted in the downlink direction over their corresponding time slots or channels in accordance with one embodiment of the invention.

FIG. 5 depicts a chart 52 indicating bit positions of downlink data components in a frame in accordance with one embodiment. Specifically, the four bits of the RXI data (referred to as RXIA0, RXIA1, RXIA2 and RXIA3) are transmitted as bits 0–3 in the frame at the 19.6608 MHz clock rate; the four bits of the RXQ data (also referred to herein as RXQA0, RXQA1, RXQA2 and RXQA3) are transmitted as bits 4–7 in the frame at the 19.6608 MHz clock rate; the one bit of downlink RS-485 based bus data or ARCNET_RX is transmitted as bit 11 of the frame at 1.25 Mbps; bit 12 of the frame corresponds to a multiplexed channel for the transmission of the bypass information and the input information via downlink serial ports at various data rates; the demultiplex synchronization pulse bit is transmitted as bit 14 of the frame at 2.4576 Mbps; the parity bit is transmitted as bit 15 of the frame; the four coding bits are transmitted as bits 16–19 of the frame; and bits 9–10 and 13 are reserved for future use and no bits are being transmitted in these bit positions. Note that the RXIA0, RXIA1, RXIA2 and RXIA3 bits may be the first or second in-phase RX data bits received over either of the diversity antennas. Similarly, the RXQA0, RXQA1, RXQA2 and RXQA3 bits may be the first or second quadrature phase RX data bits received over either of the diversity antennas. FIG. 6 depicts a downlink data transmission 60 illustrating bits of a frame being transmitted in the downlink direction over their corresponding time slots or channels in accordance with one embodiment of the invention.

It is to be understood that the above-described embodiments are merely illustrative of the invention and that many variations may be devised by those skilled in the art without departing from the scope of the invention. For example, there may exist multiple RF component enclosures connected to a single digital component enclosure, or the number of parallel data buses connecting CPLD 40 to serializer 42 and/or deserializer 44 may be different. It is therefore intended that such variations be included within the scope of the following claims.

We claim:

1. A method of data transmission comprising the steps of:
   transmitting transmit data over a first set of time slots, wherein the transmit data includes in-phase transmit data bits and quadrature phase transmit bits; and
   transmitting various uplink low rate static/control signals over a second set of time slots.

2. The method of claim 1, wherein the in-phase transmit data bits comprises of a first in-phase transmit data bit and a second in-phase transmit data bit, the first in-phase transmit data bit being transmitted over a first time slot in the first set of time slots and the second in-phase transmit data bit being transmitted over a second time slot in the first set of time slots.

3. The method of claim 2, wherein the quadrature phase transmit data bits comprises of a first quadrature phase transmit data bit and a second quadrature phase transmit data bit, the first quadrature phase transmit data bit being transmitted over a third time slot in the first set of time slots and the second quadrature phase transmit data bit being transmitted over a fourth time slot in the first set of time slots.

4. The method of claim 1, wherein the various uplink low rate static/control signals include one or more of the following: clock/reference signals, uplink RS-485 based bus data, physical address information, adjacent CDMA channel unit availability information, input information via uplink serial ports and a radio RF emergency switch.

5. The method of claim 4, wherein two or more of the various uplink low rate static/control signals are multiplexed for transmission over a first time slot in the second set of time slots.

6. The method of claim 4, wherein the uplink RS-485 based bus data includes two bits and is transmitted over a first and second time slot in the second set of time slots.

7. The method of claim 6, wherein the clock/reference signals, adjacent CDMA channel unit availability information, input information via uplink serial ports and a radio RF emergency switch are multiplexed for transmission over a third time slot in the second set of time slots.

8. The method of claim 7, wherein the physical address information is multiplexed for transmission over a fourth time slot in the second set of time slots.

9. The method of claim 1 comprising the additional step of:
transmitting a multiplex synchronization pulse over a first time slot in a third set of time slots.

10. The method of claim 9 comprising the additional step of:
transmitting a parity bit over a second time slot in the third set of time slots.

11. The method of claim 1 comprising the additional step of:
transmitting coding bits over a plurality of time slots in a third set of time slots.

12. The method of claim 1 comprising the additional step of:
receiving a downlink serial data stream comprising of receive data over a third set of time slots and various downlink low rate static/control signals over a fourth set of time slots.

13. The method of claim 12, wherein the receive data includes two bits of in-phase receive data bits received over a first antenna, two bits of in-phase receive data bits received over a second antenna, two bits of quadrature phase receive data bits received over the first antenna, two bits of quadrature phase receive data bits received over the second antenna.

14. The method of claim 13, wherein the two bits of in-phase receive data bits received over the first antenna were received over a first and second time slot in the third set of time slots, two bits of in-phase receive data bits received over the second antenna were received over a third and fourth time slot in the third set of time slots, two bits of quadrature phase receive data bits received over the first antenna were received over a fifth and sixth time slot in the third set of time slots, two bits of quadrature phase receive data bits received over the second antenna were received over a seventh and eighth time slot in the third set of time slots.

15. The method of claim 12, wherein the various downlink low rate static/control signals include one or more of the following: bypass information, input information via downlink serial ports and downlink RS-485 based bus data.

16. The method of claim 15, wherein two or more of the various downlink low rate static/control signals are multiplexed for transmission over a first time slot in the fourth set of time slots.

17. The method of claim 16, wherein the bypass information and input information via downlink serial ports are multiplexed for transmission over the first time slot in the fourth set of time slots.

18. The method of claim 16, wherein the downlink RS-485 based bus data is transmitted over a second time slot in the fourth set of time slots.

19. The method of claim 12 comprising the additional step of:
transmitting a multiplex synchronization pulse over a first time slot in a fifth set of time slots.

20. The method of claim 19 comprising the additional step of:
transmitting a parity bit over a second time slot in the fifth set of time slots.

21. The method of claim 12 comprising the additional step of:
transmitting coding bits over a plurality of time slots in a fourth set of time slots.

22. A method of data transmission comprising the steps of:
transmitting receive data over a first set of time slots, wherein the receive data includes in-phase transmit data bits and quadrature phase transmit bits; and
transmitting various downlink low rate static/control signals over a second set of time slots.

23. The method of claim 22, wherein the receive data includes two bits of in-phase receive data bits received over a first antenna, two bits of in-phase receive data bits received over a second antenna, two bits of quadrature phase receive data bits received over the first antenna, two bits of quadrature phase receive data bits received over the second antenna.

24. The method of claim 23, wherein the two bits of in-phase receive data bits received over the first antenna are transmitted over a first and second time slot in the first set of time slots, two bits of in-phase receive data bits received over the second antenna are transmitted over a third and fourth time slot in the third set of time slots, two bits of quadrature phase receive data bits received over the first antenna are transmitted over a fifth and sixth time slot in the third set of time slots, two bits of quadrature phase receive data bits received over the second antenna are transmitted over a seventh and eighth time slot in the third set of time slots.

25. The method of claim 22, wherein the various downlink low rate static/control signals include one or more of the following: bypass information, input information via downlink serial ports and downlink RS-485 based bus data.

26. The method of claim 25, wherein two or more of the various downlink low rate static/control signals are multiplexed for transmission over a first time slot in the second set of time slots.

27. The method of claim 26, wherein the bypass information and input information via downlink serial ports are multiplexed for transmission over the first time slot in the second set of time slots.

28. The method of claim 26, wherein the downlink RS-485 based bus data is transmitted over a second time slot in the second set of time slots.

29. The method of claim 22 comprising the additional step of:
  transmitting a demultiplex synchronization pulse over a first time slot in a third set of time slots.

30. The method of claim 29 comprising the additional step of:
  transmitting a parity bit over a second time slot in the third set of time slots.

31. The method of claim 22 comprising the additional step of:
  transmitting coding bits over a plurality of time slots in a third set of time slots.

32. An interface for data transmission comprising of:
  a first set of parallel transmission mediums;
  a complex programmable logic device connected to a plurality of digital components and connected to one end of the first set of parallel transmission mediums, the complex programmable logic device being operable to accept transmit data and various uplink low rate static/control data from the plurality of digital components, to multiplex the transmit data or various uplink low rate static/control data, and to send the transmit data and various uplink low rate static/control data over the first set of parallel transmission mediums;
  a first serial transmission medium;
  a serializer connected to another end of the first set of parallel transmission mediums and to one end of the first serial transmission medium, the serializer being operable to accept the transmit data and various uplink low rate static/control signals sent by the complex programmable logic device and to sequentially send the transmit data and various uplink low rate static/control signals serially over the first serial transmission medium; and
  a transmitter connected to another end of the first serial transmission medium, the transmitter being operable to accept the transmit data and various uplink low rate static/control signals sent by the serializer and to send the transmit data and various uplink low rate static/control signals over another transmission medium.

33. The interface of claim 32, wherein the transmit data comprises of a first in-phase transmit data bit, a second in-phase transmit data bit, a first quadrature phase transmit data bit and a second quadrature phase transmit data bit, the complex programmable logic device being operable to transmit the first in-phase transmit data bit over a first transmission medium in the first set of parallel transmission mediums, the second in-phase transmit data bit over a second transmission medium in the first set of parallel transmission mediums, the first quadrature phase transmit data bit over a third transmission medium in the first set of parallel transmission mediums and the second quadrature phase transmit data bit over a fourth transmission medium in the first set of parallel transmission mediums.

34. The interface of claim 33, wherein the various uplink low rate static/control signals comprises of clock/reference signals, uplink RS-485 based bus data, physical address information, adjacent CDMA channel unit availability information, input information via uplink serial ports and a radio RF emergency switch, the complex programmable logic device being operable to multiplex the clock/reference signals, adjacent CDMA channel unit availability information, input information via uplink serial ports and a radio RF emergency switch to produce an uplink multiplexed data stream, the complex programmable logic device being operable to transmit the uplink multiplexed data stream over a fifth transmission medium in the first set of parallel transmission mediums, the uplink RS-485 based bus data over a sixth and seventh transmission medium in the first set of parallel transmission mediums and the physical address information over a eighth transmission medium in the first set of parallel transmission mediums.

35. The interface of claim 34 further comprising:
  a second serial transmission medium;
  a receiver connected to the second serial transmission medium, the receiver being operable to accept receive data and various downlink low rate static/control signals and to send the receive data and various downlink low rate static/control signals over the second serial transmission medium;
  a second set of parallel transmission mediums connected at one end to the complex programmable logic device;
  a deserializer connected to another end of the second set of parallel transmission mediums and to another end of the second serial transmission medium, the deserializer being operable to accept the receive data and various downlink low rate static/control signals sent by the receiver and to sequentially send the receive data and various downlink low rate static/control signals over the second set of parallel transmission mediums, the complex programmable logic device being operable to accept the receive data and various downlink low rate static/control signals sent by the deserializer and to send the receive data and various downlink low rate static/control signals to the plurality of digital components.

36. The interface of claim 35, wherein the receive data comprises of a first in-phase receive data bit, a second in-phase receive data bit, a third in-phase receive data bit, a fourth in-phase receive data bit, a first quadrature phase receive data bit, a second quadrature phase receive data bit, a third quadrature phase receive data bit and a fourth quadrature phase receive data bit, the first and second in-phase and quadrature phase receive data bits being received over a first antenna, the third and fourth in-phase and quadrature phase receive data bits being received over a second antenna, the complex programmable logic device being operable to transmit the first in-phase receive data bit over a first transmission medium in the second set of parallel transmission mediums, the second in-phase receive data bit over a second transmission medium in the second set of parallel transmission mediums, the third in-phase receive data bit over a third transmission medium in the second set of parallel transmission mediums, the fourth in-phase receive data bit over a fourth transmission medium in the second set of parallel transmission mediums, the first quadrature phase receive data bit over a fifth transmission medium in the second set of parallel transmission mediums, the second quadrature phase receive data bit over a sixth transmission medium in the second set of parallel transmission mediums, the third quadrature phase receive data bit over a seventh transmission medium in the second set of parallel transmission mediums, the fourth quadrature phase receive data bit over a eighth transmission medium in the second set of parallel transmission mediums.

37. The interface of claim 36, wherein the various downlink low rate static/control signals comprises bypass information, input information via downlink serial ports and downlink RS-485 based bus data, the complex programmable logic device being operable to multiplex the bypass information and input information via downlink serial ports to produce a downlink multiplexed data stream, the complex programmable logic device being operable to transmit the downlink multiplexed data stream over a ninth transmission medium in the second set of parallel transmission mediums and the downlink RS-485 based bus data over a tenth transmission medium in the second set of parallel transmission mediums.

38. An interface for data transmission comprising of:
a first set of parallel transmission mediums;
a complex programmable logic device connected to a plurality of RF components and connected to one end of the first set of parallel transmission mediums, the complex programmable logic device being operable to accept receive data and various downlink low rate static/control data from the plurality of RF components, to multiplex the transmit data or various downlink low rate static/control data, and to send the receive data and various downlink low rate static/control data over the first set of parallel transmission mediums;
a first serial transmission medium;
a serializer connected to another end of the first set of parallel transmission mediums and to one end of the first serial transmission medium, the serializer being operable to accept the receive data and various downlink low rate static/control signals sent by the complex programmable logic device and to sequentially send the receive data and various downlink low rate static/control signals serially over the first serial transmission medium; and
a transmitter connected to another end of the first serial transmission medium, the transmitter being operable to accept the receive data and various downlink low rate static/control signals sent by the serializer and to send the receive data and various downlink low rate static/control signals over another transmission medium.

39. The interface of claim 38, wherein the receive data comprises of a first in-phase receive data bit, a second in-phase receive data bit, a third in-phase receive data bit, a fourth in-phase receive data bit, a first quadrature phase receive data bit, a second quadrature phase receive data bit, a third quadrature phase receive data bit and a fourth quadrature phase receive data bit, the first and second in-phase and quadrature phase receive data bits being received over a first antenna, the third and fourth in-phase and quadrature phase receive data bits being received over a second antenna, the complex programmable logic device being operable to transmit the first in-phase receive data bit over a first transmission medium in the first set of parallel transmission mediums, the second in-phase receive data bit over a second transmission medium in the first set of parallel transmission mediums, the third in-phase receive data bit over a third transmission medium in the first set of parallel transmission mediums, the fourth in-phase receive data bit over a fourth transmission medium in the first set of parallel transmission mediums, the first quadrature phase receive data bit over a fifth transmission medium in the first set of parallel transmission mediums, the second quadrature phase receive data bit over a sixth transmission medium in the first set of parallel transmission mediums, the third quadrature phase receive data bit over a seventh transmission medium in the first set of parallel transmission mediums, the fourth quadrature phase receive data bit over a eighth transmission medium in the first set of parallel transmission mediums.

40. The interface of claim 39, wherein the various downlink low rate static/control signals comprises bypass information, input information via downlink serial ports and downlink RS-485 based bus data, the complex programmable logic device being operable to multiplex the bypass information and input information via downlink serial ports to produce a downlink multiplexed data stream, the complex programmable logic device being operable to transmit the downlink multiplexed data stream over a ninth transmission medium in the second set of parallel transmission mediums and the downlink RS-485 based bus data over a tenth transmission medium in the second set of parallel transmission mediums.

41. The interface of claim 38 further comprising:
a second serial transmission medium;
a receiver connected to the second serial transmission medium, the receiver being operable to accept transmit data and various uplink low rate static/control signals and to send the transmit data and various uplink low rate static/control signals over the second serial transmission medium;
a second set of parallel transmission mediums connected at one end to the complex programmable logic device;
a deserializer connected to another end of the second set of parallel transmission mediums and to another end of the second serial transmission medium, the deserializer being operable to accept the transmit data and various uplink low rate static/control signals sent by the receiver and to sequentially send the transmit data and various uplink low rate static/control signals over the second set of parallel transmission mediums, the complex programmable logic device being operable to accept the transmit data and various uplink low rate static/control signals sent by the deserializer and to send the transmit data and various uplink low rate static/control signals to the plurality of RF components.

42. The interface of claim 41, wherein the transmit data comprises of a first in-phase transmit data bit, a second in-phase transmit data bit, a first quadrature phase transmit data bit and a second quadrature phase transmit data bit, the complex programmable logic device being operable to transmit the first in-phase transmit data bit over a first transmission medium in the first set of parallel transmission mediums, the second in-phase transmit data bit over a second transmission medium in the first set of parallel transmission mediums, the first quadrature phase transmit data bit over a third transmission medium in the first set of parallel transmission mediums and the second quadrature phase transmit data bit over a fourth transmission medium in the first set of parallel transmission mediums.

43. The interface of claim 42, wherein the various uplink low rate static/control signals comprises of clock/reference signals, uplink RS-485 based bus data, physical address information, adjacent CDMA channel unit availability information, input information via uplink serial ports and a radio RF emergency switch, the complex programmable logic device being operable to multiplex the clock/reference signals, adjacent CDMA channel unit availability information, input information via uplink serial ports and a radio RF emergency switch to produce an uplink multiplexed data stream, the complex programmable logic device being operable to transmit the uplink multiplexed data stream over a fifth transmission medium in the first set of parallel transmission mediums, the uplink RS-485 based bus data over a sixth and seventh transmission medium in the first set of parallel transmission mediums and the physical address information over a eighth transmission medium in the first set of parallel transmission mediums.

* * * * *